United States Patent Office 3,100,370
Patented Aug. 13, 1963

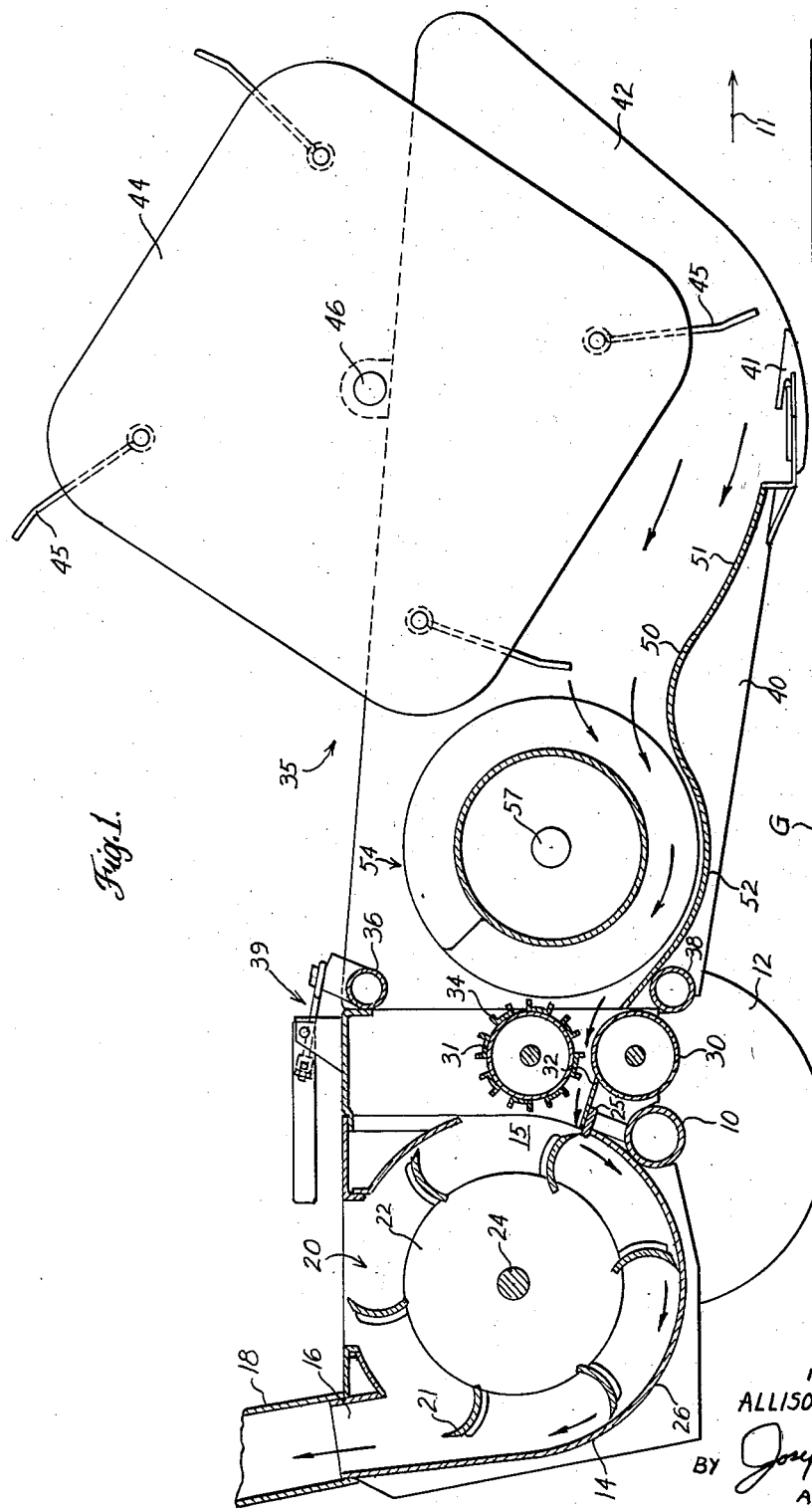

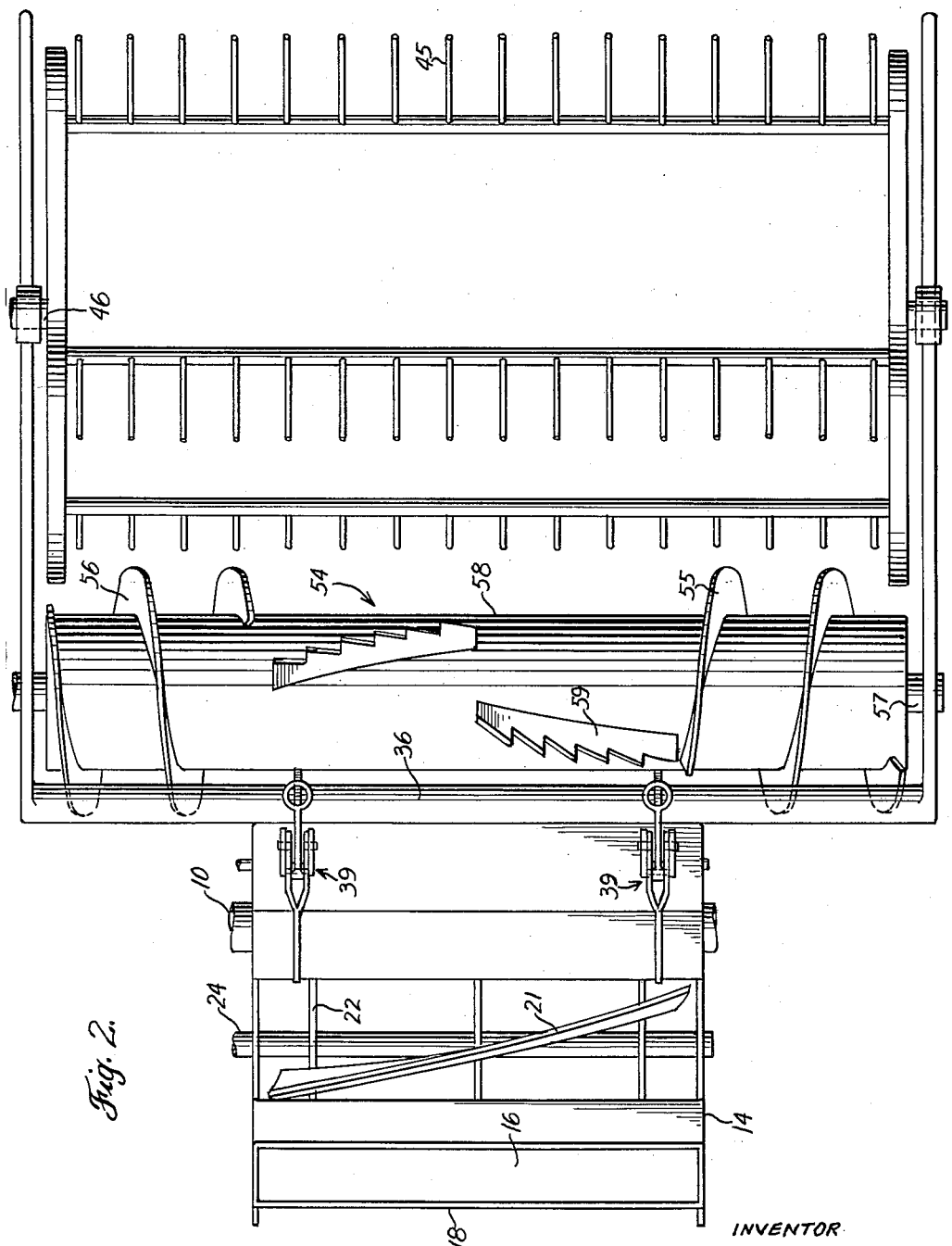

3,100,370
FORAGE HARVESTER
Allison W. Blanshine, Lititz, Pa., assignor to Sperry Rand Corporation, New Holland, Pa., a corporation of Delaware
Filed July 25, 1961, Ser. No. 126,722
3 Claims. (Cl. 56—21)

A conventional forage harvester provides means for severing a standing crop. After cutting, the material is elevated a substantial distance by a slatted conveyor or other means. Prior or subsequent to elevation, the material is laterally consolidated so that it may be fed through a relatively narrow infeed opening. The material is delivered to a mechanism which chops and then discharges the material to a trailing wagon or the like.

The higher the harvester elevates the material before delivering it to the chopper mechanism, the more work required and the greater the power consumption. Reducing crop elevation to a minimum is therefore highly desirable.

A main object of this invention is to provide a forage harvester having operative components related to each other in a "low-line" whereby elevation of material is held to a minimum.

Another object of this invention is to provide a forage harvester of the character described wherein material is fed directly from a cutter bar to consolidating means and directly therefrom to infeed rolls of a chopper mechanism, no intermediate elevating means being provided.

Another object of this invention is to provide a forage harvester of the character described which will operate and feed crop material to a chopper mechanism with less power than heretofore required.

A further object of this invention is to provide a forage harvester which is of simple construction, low in cost, and inexpensive to manufacture and repair.

Other objects of this invention will be apparent hereinafter from the specification and from the recital in the appended claims.

In the drawings:

FIG. 1 is a longitudinal medial vertical section through a forage harvester constructed according to this invention; and FIG. 2 is a plan view of the harvester shown in FIG. 1.

Referring now to the drawings by numerals of reference, 10 denotes a harvester frame adapted to travel forwardly indicated by the arrow 11 in FIG. 1. The frame 10 is supported on ground wheels, one of which is shown at 12. Mounted on frame 10 adjacent a rearward portion thereof is a housing 14 which is generally cylindrical when viewed in side elevation as shown in FIG. 1. The housing 14 has a forwardly directed inlet opening 15 and a rearward discharge opening 16. The discharge opening 16 communicates with an upwardly extending spout or discharge tube 18.

Operative in housing 14 is a chopper 20 which comprises a plurality of angularly spaced knives 21 supported on discs 22 extending radially from shaft 24. The chopper is adapted to rotate in a clockwise direction when viewed as shown in FIG. 1. The knives 21 successively pass a stationary shear bar 25 mounted on frame 10 adjacent the lower portion of the infeed opening 15. Knives 21 extend angularly relative to the axis of the shaft 24 (FIG. 2) whereby each knife on passing shear bar 25 exerts a shearing action. The bottom portion of the housing 14, denoted 26, extends from shear bar 25 to discharge opening 16 and is generally concentric with the axis of rotation of chopper 20. Cut crop material is swept along the arcuate bottom of the housing and then thrown and blown through the discharge opening 16 and spout 18. The material is then deposited in a trailing wagon or the like.

Mounted on the frame 10 directly in front of the infeed opening 15 are infeed rolls, namely, lower roll 30 and upper roll 31. The rolls 30 and 31 are disposed to cooperate and deliver material toward the lower portion of the infeed opening 15. The delivered material travels rearwardly over a flat support plate 32 and then over shear bar 25. As shown in FIG. 1, the lower roll 30 is smooth while the upper roll 31 has transverse ribs or slats 34 which exert an aggressive feeding action on the material.

Extending forwardly of the infeed rolls 30 and 31 is a header 35 including frame members 36 and 38 fastened to housing 14 and frame 10 by means including latches 39. The header has a frame structure 40 and mounted on the forward end thereof is a conventional sickle-type cutter 41 which is disposed adjacent the ground G. The header has side members 42 which serve as crop dividers and mounted thereon is a reel 44. Reel 44 has rake fingers 45 which travel around the axis of reel shaft sections 46 and sweep downwardly, rearwardly and then upwardly over the cutter 41. Fingers 45 deliver crop material to the cutter and sweep the material rearwardly after it has been severed.

Reel 44 is operative to deliver material to a support 50 which extends downwardly and forwardly from adjacent the lower roll 30 to the cutter 41. Support 50 has a forward arcuate portion 51 onto which the crop material is initially deposited. The portion 51 is generally concentric with the axis of rotation of reel 44. Fingers 45 sweep the material over support portion 51 and deposit it in a shallow trough 52 above which a consolidating auger 54 is operative. The consolidating auger 54 comprises auger sections 55 and 56 (FIG. 2) which deliver material to a central auger area 58 when longitudinally extending tooth deflector members 59 are operative. The deflectors 59 engage the material and discharge it rearwardly toward the infeed rolls 30 and 34.

The overall arrangement of the harvester is such that the successive operative components cooperate with each other in the delivery of material to housing 14. On forward travel of the harvester, cutter 41 engages standing crop material. Reel 44 sweeps the material into the cutter 41 and after the material is cut, the reel fingers convey the material toward consolidating auger 54. The rotating auger operates to strip the material from reel fingers 45 and the infeed roll 31 operates to strip the material from the deflectors 59 of the auger. The knives 21 on the cutter 20 sweep downwardly and pull the material from the infeed roll 31 and chop it in cooperation with the shear bar 25.

In moving from the cutter bar 41, the crop material slides over the arcuate portion 51 of the support 50 to the trough 52. Then the material slides rearwardly to the infeed rolls 30 and 31, and then over the support floor 32 to the shear bar 25. After the material is cut, it is swept along the arcuate bottom of the housing 14 and then discharged through opening 16. The path of travel of the material is indicated by the series of arrows in FIG. 1.

As clearly shown in FIG. 1, the forage harvester has a very low line. No elevating mechanism is provided beneath the material, the material merely sliding over the inclined support 50. Since very little elevation is imparted to the material, the power requirement of the harvester is low. A plane through the axis 24 of the cutter 20 and through the axis 57 of the consolidating auger 54, forms a very slight angle with the ground G, approaching horizontal. In FIG. 1, the angle thus formed is about five degrees and substantially less than the thirty degree or higher angle normally found in forage harvesters. It will also be noted that the arcuate portions 51 and 52 of the support 50 extend substantially less than ninety degrees relative to the reel 44 and consolidating auger 54, respectively. As a result, the reel and auger are required to push the crop material only a slight distance upwardly before it is discharged to the next mechanism.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A low-line forage harvester comprising, in combination, a frame adapted to travel forwardly, a housing mounted on said frame and having a forwardly directed feed opening, a shear bar mounted across a lower portion of said opening, a chopper rotatable in said housing and having a plurality of knives successively cooperative with said shear bar to sever material fed through said opening, a pair of infeed rolls mounted one above the other directly in front of said opening and cooperative to feed material rearwardly and over said shear bar, a cutter mounted on said frame adjacent the ground and spaced forwardly of said infeed rolls, a support traversing said space and inclined downwardly and forwardly from said infeed rolls to said cutter and over which crop material may slide rearwardly, rotatable auger means mounted over a rearward portion of said support in front of said infeed rolls and rearwardly of said cutter for consolidating and rearwardly discharging material directly to the infeed rolls, and a reel mounted on said frame directly over said cutter and operable to sweep cut material directly to said rotatable auger means and over a forward portion of said support, said support rearward portion being arcuate and generally concentric to said auger means, and said forward portion of said support being arcuate and generally concentric to said reel.

2. A low-line forage harvester as recited in claim 1 wherein said arcuate portions of said support have an extent, respectively, of less than ninety degrees.

3. A low-line forage harvester as recited in claim 1 wherein a plane through the axes of rotation of said chopper and said rotatable auger means forms an angle with the ground of substantially less than thirty degrees.

References Cited in the file of this patent

UNITED STATES PATENTS

| | | |
|---|---|---|
| 2,529,180 | Oehler | Nov. 7, 1950 |
| 3,023,560 | Krahn | Mar. 6, 1962 |